(12) United States Patent
Maikawa

(10) Patent No.: US 11,254,226 B2
(45) Date of Patent: Feb. 22, 2022

(54) COIL POSITION DETECTING METHOD FOR NON-CONTACT POWER SUPPLY SYSTEM, AND NON-CONTACT POWER SUPPLY SYSTEM

(71) Applicant: NISSAN MOTOR CO., LTD., Yokohama (JP)

(72) Inventor: Kengo Maikawa, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/303,287

(22) PCT Filed: May 23, 2016

(86) PCT No.: PCT/JP2016/065211
§ 371 (c)(1),
(2) Date: Nov. 20, 2018

(87) PCT Pub. No.: WO2017/203579
PCT Pub. Date: Nov. 30, 2017

(65) Prior Publication Data
US 2019/0210477 A1 Jul. 11, 2019

(51) Int. Cl.
H02J 50/90 (2016.01)
B60L 53/12 (2019.01)
B60L 53/36 (2019.01)
H02J 50/12 (2016.01)
B60L 53/38 (2019.01)
H02J 50/10 (2016.01)
H04B 5/00 (2006.01)

(52) U.S. Cl.
CPC ............... *B60L 53/12* (2019.02); *B60L 53/36* (2019.02); *B60L 53/38* (2019.02); *H02J 50/10* (2016.02); *H02J 50/12* (2016.02); *H02J 50/90* (2016.02); *H04B 5/0037* (2013.01); *H04B 5/0075* (2013.01)

(58) Field of Classification Search
CPC .......... B60L 53/12; H02J 50/90; H02J 50/00; H04B 5/00
USPC ....................................................... 307/104
See application file for complete search history.

(56) References Cited

U.S. PATENT DOCUMENTS

| 9,536,655 | B2 | 1/2017 | Ichikawa |
| 9,969,280 | B2 | 5/2018 | Maikawa et al. |
| 10,195,951 | B2 * | 2/2019 | Maikawa ................ B60M 7/00 |
| 2009/0206791 | A1 | 8/2009 | Jung |

(Continued)

FOREIGN PATENT DOCUMENTS

| CN | 102640395 A | 8/2012 |
| JP | 2009-201344 A | 9/2009 |

(Continued)

*Primary Examiner* — Adi Amrany
(74) *Attorney, Agent, or Firm* — Foley & Lardner LLP

(57) ABSTRACT

The invention provides a non-contact power supply system which supplies power from a power feeding coil on a ground side to a power receiving coil on a vehicle side, and provides a coil position detecting method of detecting a position of a power receiving coil. An excitation voltage and an excitation frequency for the power feeding coil are changed depending on the position of the power receiving coil relative to the power feeding coil. Then, the position of the power receiving coil is detected based on a received voltage with the power receiving coil when the power feeding coil is excited.

7 Claims, 13 Drawing Sheets

(56) References Cited

U.S. PATENT DOCUMENTS

| | | | |
|---|---|---|---|
| 2010/0244577 A1* | 9/2010 | Shimokawa | B60L 53/305 307/104 |
| 2011/0316477 A1 | 12/2011 | Jung | |
| 2012/0326499 A1* | 12/2012 | Ichikawa | H02J 50/70 307/9.1 |
| 2013/0057080 A1* | 3/2013 | Smith | H02J 5/005 307/104 |
| 2013/0234503 A1 | 9/2013 | Ichikawa | |
| 2013/0335015 A1 | 12/2013 | Ichikawa et al. | |
| 2013/0335016 A1 | 12/2013 | Jung | |
| 2014/0103871 A1 | 4/2014 | Maikawa et al. | |
| 2014/0145517 A1* | 5/2014 | Ogasawara | H01F 38/14 307/104 |
| 2014/0285030 A1* | 9/2014 | Nakamura | B60L 53/12 307/104 |
| 2014/0333144 A1 | 11/2014 | Ikeuchi et al. | |
| 2015/0061580 A1* | 3/2015 | Yamakawa | H01M 10/44 320/108 |
| 2015/0180286 A1* | 6/2015 | Asanuma | G01B 7/003 307/104 |
| 2016/0064951 A1 | 3/2016 | Yamamoto et al. | |
| 2016/0114688 A1* | 4/2016 | Koizumi | H02J 5/005 307/104 |
| 2016/0339790 A1* | 11/2016 | Tsukamoto | B60L 53/34 |
| 2017/0126060 A1* | 5/2017 | Tsukamoto | H02J 7/025 |

FOREIGN PATENT DOCUMENTS

| | | |
|---|---|---|
| JP | 2011-15549 A | 1/2011 |
| JP | 2014-220893 | 11/2014 |
| JP | 2015-39249 A | 2/2015 |
| JP | 2016-7107 A | 1/2016 |
| JP | 2016-7275 A | 1/2016 |
| KR | 20140025529 A | 3/2014 |
| WO | WO 2015-015635 A1 | 2/2015 |
| WO | WO 2015/015771 A1 | 2/2015 |

* cited by examiner

(12) United States Patent

COIL POSITION DETECTING METHOD FOR NON-CONTACT POWER SUPPLY SYSTEM, AND NON-CONTACT POWER SUPPLY SYSTEM

TECHNICAL FIELD

The present invention relates to a coil position detecting method for a non-contact power supply system that supplies power to a vehicle in a non-contact manner, and to the non-contact power supply system.

BACKGROUND ART

A technique disclosed in Patent Literature 1 has heretofore been known as a system to assist in locating a parking position in a case of non-contact power supply. When a vehicle goes in reverse for parking, the parking assistance system disclosed in Patent Literature 1 guides the vehicle while displaying an image shot with a backup camera. Then, as a power supply unit gets under the vehicle and disappears from the viewfinder, the power supply unit is excited with less power than that applied during usual charge, so as to determine a position of the vehicle by calculating a distance between the power supply unit and a power receiving unit based on the magnitude of the power detected with the power receiving unit.

CITATION LIST

Patent Literature

Patent Literature 1: Japanese Patent Application Publication No. 2011-15549

SUMMARY OF INVENTION

However, the conventional example disclosed in Patent Literature 1 is designed to guide the vehicle by using the image shot with the camera when the vehicle is away from the power supply unit, and is therefore unable to determine whether or not magnetic fluxes outputted from the power supply unit are interlinked with the power receiving unit loaded on the vehicle. As a consequence, the magnetic fluxes outputted from the power supply unit may adversely affect the surroundings of the vehicle.

The present invention has been made to solve the aforementioned problem of the background art. An object of the present invention is to provide a non-contact power supply system and a coil position detecting method for a non-contact power supply system, which are capable of avoiding an adverse effect of magnetic fluxes outputted from a power supply device on the surroundings of a vehicle.

In a coil position detecting method according to an aspect of the present invention, an excitation voltage and an excitation frequency for a power feeding coil are changed depending on a position of a power receiving coil relative to the power feeding coil, and the position of the power receiving coil is detected based on a received voltage with the power receiving coil when the power feeding coil is excited.

A non-contact power supply system according to an aspect of the present invention includes an excitation voltage-frequency change circuit which changes an excitation voltage and an excitation frequency for a power feeding coil depending on a positional relation between the power feeding coil and a power receiving coil. In addition, the system includes a position detection circuit which detects a position of the power receiving coil based on a received voltage with the power receiving coil when the power feeding coil is excited.

Advantageous Effects of Invention

According to the present invention, the excitation voltage for the power feeding coil is changed and the position of the power receiving coil is detected based on the received voltage with the power receiving coil. Thus, it is possible to avoid an adverse effect of magnetic fluxes generated by excitation on the surroundings.

DESCRIPTION OF EMBODIMENTS

Description of First Embodiment

An embodiment applying the present invention will be described below with reference to the drawings.

[Configuration of Non-Contact Power Supply System]

Figure 1:
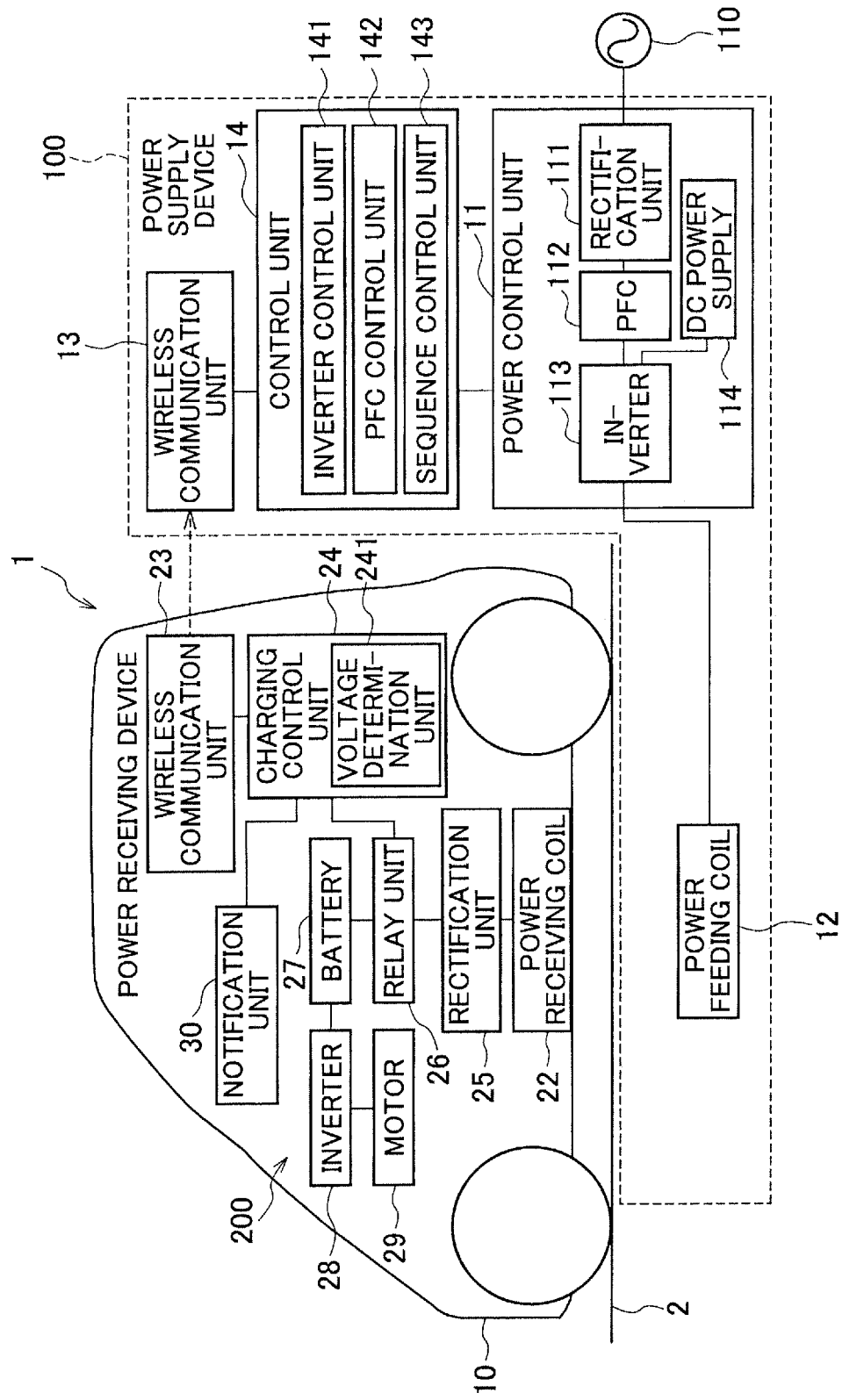
FIG. 1 is a block diagram showing a configuration of a non-contact power supply system according to an embodiment of the present invention.

FIG. 1 is a block diagram showing a configuration of a non-contact power supply system which adopts a coil position detecting method of this embodiment. As shown in FIG. 1, this non-contact power supply system 1 includes a power supply device 100 which is a ground side unit, and a power receiving device 200 which is a vehicle side unit. This non-contact power supply system 1 is configured to charge an in-vehicle battery by supplying power in a non-contact manner from the power supply device 100, which is installed in a charging station or the like, to the power receiving device 200 loaded on a vehicle 10 such as an electric car and a hybrid car.

The power supply device 100 includes a power feeding coil 12 which is installed in a parking space 2 near the charging station. On the other hand, the power receiving device 200 includes a power receiving coil 22 disposed on a bottom surface of the vehicle 10. This power receiving coil 22 is deployed so as to face the power feeding coil 12 when the vehicle 10 is stopped at a predetermined position (a chargeable position to be described later) in the parking space 2.

The power feeding coil 12 is formed from a primary coil made of a conductive wire, and is configured to feed power to the power receiving coil 22. Meanwhile, the power receiving coil 22 is formed from a secondary coil made of a conductive wire likewise, and is configured to receive the power from the power feeding coil 12. An electromagnetic induction action between these coils makes it possible to supply the power from the power feeding coil 12 to the power receiving coil 22 in a contactless manner.

The power supply device 100 on the ground side includes a power control unit 11, the power feeding coil 12, a wireless communication unit 13, and a control unit 14.

The power control unit 11 is a circuit for transforming alternating-current power fed from an alternating-current power supply 110 into high-frequency alternating-current power and feeding the transformed power to the power feeding coil 12. Moreover, the power control unit 11 includes a rectification unit 111, a PFC circuit 112, a DC power supply 114, and an inverter 113.

The rectification unit 111 is a circuit which is electrically connected to the alternating-current power supply 110 and configured to rectify the alternating-current power outputted from the alternating-current power supply 110. The PFC circuit 112 is a (power factor correction) circuit for correcting a power factor by shaping a waveform outputted from the rectification unit 111, which is connected between the rectification unit 111 and the inverter 113.

The inverter 113 includes a PWM control circuit formed from switching elements such as IGBTs. The inverter 113 converts direct-current power into alternating-current power based on switching control signals and supplies the alternating-current power to the power feeding coil 12. The DC power supply 114 outputs a direct-current voltage to be used when bringing the power feeding coil 12 into very weak excitation (to be described later in detail).

The wireless communication unit 13 carries out bidirectional communication with a wireless communication unit 23 provided on the vehicle 10 side.

The control unit 14 is configured to control the entire power supply device 100. The control unit 14 includes an inverter control unit 141, a PFC control unit 142, and a sequence control unit 143. The control unit 14 executes parking position determination processing when the vehicle 10 is parked in the parking space 2. In this case, the PFC control unit 142 generates an excitation power command to the power feeding coil 12 while the inverter control unit 141 controls the inverter 113 by generating a frequency command and a duty applicable to excitation power. Thus, the control unit 14 feeds the power for determining the parking position from the power feeding coil 12 to the power receiving coil 22. As described later, when the parking position determination processing is executed, the power for the parking position determination processing is fed by bringing the power feeding coil 12 into very weak excitation or weak excitation. Meanwhile, the sequence control unit 143 exchanges sequence information with the power receiving device 200 through the wireless communication unit 13. Accordingly, the control unit 14 has functions as an excitation voltage-frequency change circuit that changes an excitation voltage and an excitation frequency for the power feeding coil 12 depending on the position of the power receiving coil 22 relative to the power feeding coil 12.

On the other hand, the power receiving device 200 on the vehicle 10 side includes the power receiving coil 22, the wireless communication unit 23, a charging control unit 24, a rectification unit 25, a relay unit 26, a battery 27, an inverter 28, a motor 29, and a notification unit 30.

The power receiving coil 22 is disposed at such a position as to be located immediately above and opposed face-to-face to the power feeding coil 12 while defining a distance to the power feeding coil 12 at a prescribed value when the vehicle 10 is parked at a predetermined stop position in the parking space 2.

The wireless communication unit 23 carries out the bidirectional communication with the wireless communication unit 13 provided on the power supply device 100 side.

The charging control unit 24 is a controller configured to control charging of the battery 27. The charging control unit 24 includes a voltage determination unit 241. In particular, the charging control unit 24 executes the parking position determination processing when the vehicle 10 is parked in the parking space 2. In this case, the voltage determination unit 241 monitors the power received with the power receiving coil 22. Then, the position of the power receiving coil 22 is detected based on a received voltage with the power receiving coil 22 when the power feeding coil 12 is excited. In other words, the charging control unit 24 has a function as a position detection circuit. Details of the parking position determination processing will be described later in detail. In the meantime, the charging control unit 24 controls the wireless communication unit 23, the notification unit 30, the relay unit 26, and the like. The charging control unit 24 transmits a signal instructing to start the charging to the control unit 14 of the power supply device 100 through the wireless communication unit 23.

The rectification unit 25 is formed from a rectification circuit which is connected to the power receiving coil 22 and configured to rectify the alternating-current power received with the power receiving coil 22 into the direct-current power.

The relay unit 26 includes a relay switch to be switched on and off by the control of the charging control unit 24. In addition, the relay unit 26 disconnects a main circuit system including the battery 27 from the power receiving coil 22 and the rectification unit 25 collectively constituting a charging circuit unit by turning the relay switch off.

The battery 27 is formed by connecting multiple secondary batteries, and serves as a power source for the vehicle 10.

The inverter 28 includes a PWM control circuit formed from switching elements such as IGBTs. The inverter 28 converts direct-current power outputted from the battery 27 into alternating-current power based on switching control signals, and supplies the alternating-current power to the motor 29.

The motor 29 is formed from a three-phase alternating-current motor, for example, and constitutes a driving force for driving the vehicle 10.

The notification unit 30 is formed from an alarm lamp, any of a display unit and a speaker of a navigation system, and the like. The notification unit 30 outputs light, images, voices, and the like to a user based on the control by the charging control unit 24.

According to the configuration described above, the non-contact power supply system 1 transmits and receives high-frequency power in a non-contact manner by an electromagnetic induction action between the power feeding coil 12 and the power receiving coil 22. In other words, a magnetic linkage is established between the power feeding coil 12 and the power receiving coil 22 by supplying the power to the power feeding coil 12. As a consequence, the power is supplied from the power feeding coil 12 to the power receiving coil 22.

[Description of Very Weak Excitation and Weak Excitation of Power Feeding Coil 12]

When the vehicle 10 is parked in the parking space 2 for carrying out the non-contact power supply, the non-contact power supply system 1 of this embodiment executes the parking position determination processing in order to determine whether or not the vehicle 10 is parked at a position so that the vehicle 10 can be charged. The parking position where it is possible to charge the battery 27 by causing the power receiving coil 22 to receive the power fed from the power feeding coil 12 will be hereinafter referred to as the "chargeable position". Specifically, when the vehicle 10 is parked at the chargeable position in the parking space 2, the power feeding coil 12 and the power receiving coil 22 are located opposite to each other. To be more precise, a coupling coefficient between the power feeding coil 12 and the power receiving coil 22 reaches a prescribed coupling coefficient (which will be defined as an "allowable coupling coefficient"). Here, the "coupling coefficient" indicates a ratio of magnetic fluxes to be interlinked with the power receiving coil 22 out of all the magnetic fluxes to be outputted by the excitation of the power feeding coil 12. Accordingly, the coupling coefficient reaches a maximum when both of the coils 12 and 22 are opposed face-to-face. Meanwhile, the "allowable coupling coefficient" means a minimum required coupling coefficient for carrying out the non-contact power supply.

When the vehicle 10 approaching the chargeable position is detected in the parking position determination processing, the power feeding coil 12 is brought into very weak excitation by supplying very weak power to the power feeding coil 12 as power for the determination. Moreover, when the vehicle 10 approaches the chargeable position and the voltage received with the power receiving coil 22 exceeds a preset first threshold voltage Vth1, the power feeding coil 12 is brought into weak excitation by applying supplying weak power that is larger than the aforementioned very weak power to the power feeding coil 12. For example, the power feeding coil 12 is switched from the very weak excitation to the weak excitation when the power receiving coil 22 partially overlaps the power feeding coil 12 as the vehicle 10 approaches the chargeable position in the parking space 2 and the voltage thus generated in the power receiving coil 22 reaches the first threshold voltage Vth1.

Furthermore, the vehicle 10 is determined to have reached the chargeable position when the received power with the power receiving coil 22 exceeds a preset second threshold voltage Vth2 after bringing the power feeding coil 12 into the weak excitation. In other words, the coupling coefficient between the power feeding coil 12 and the power receiving coil 22 is determined to have reached the allowable coupling coefficient. A reason why the power feeding coil 12 should be switched from the very weak excitation to the weak excitation will be described below.

When the vehicle 10 is approaching the chargeable position, a person may come close to the power feeding coil 12 installed at an appropriate position in the parking space 2 or a metallic foreign object may be placed near the power feeding coil 12. Hence, there is a risk of adversely affecting the human body or the foreign object when the power feeding coil 12 is excited. Accordingly, the excitation of the power feeding coil 12 should be set as weak as possible. For this reason, when the vehicle 10 is located at a position away from the parking space 2, the power feeding coil 12 is brought into the very weak excitation.

Meanwhile, when the power feeding coil 12 is brought into the very weak excitation, the received power with the power receiving coil 22, that is, the detected voltage becomes an extremely low voltage. For this reason, it is difficult to measure the voltage generated on the power receiving coil 22 at high accuracy with a commonly used inexpensive detection device. As a consequence, a high-performance detection device will be required. In other words, there is a trade-off relation between the reduction in adverse effect on the human body or the foreign object and the improvement in detection accuracy of the voltage.

In this embodiment, the power feeding coil is excited at a frequency near a resonance point between the power feeding coil 12 and the power receiving coil 22 when bringing the power feeding coil 12 into the very weak excitation so as to obtain the higher received voltage. Hence, the detection of the voltage is enabled without using the high-performance detection device. In the meantime, when the vehicle 10 approaches the chargeable position, the position of the vehicle 10 is detected at high accuracy by switching from the very weak excitation to the weak excitation.

A reason for setting the excitation frequency when bringing the power feeding coil 12 into the very weak excitation at the frequency near the resonance point between the power feeding coil 12 and the power receiving coil 22 will be described below in detail.

Figure 2:
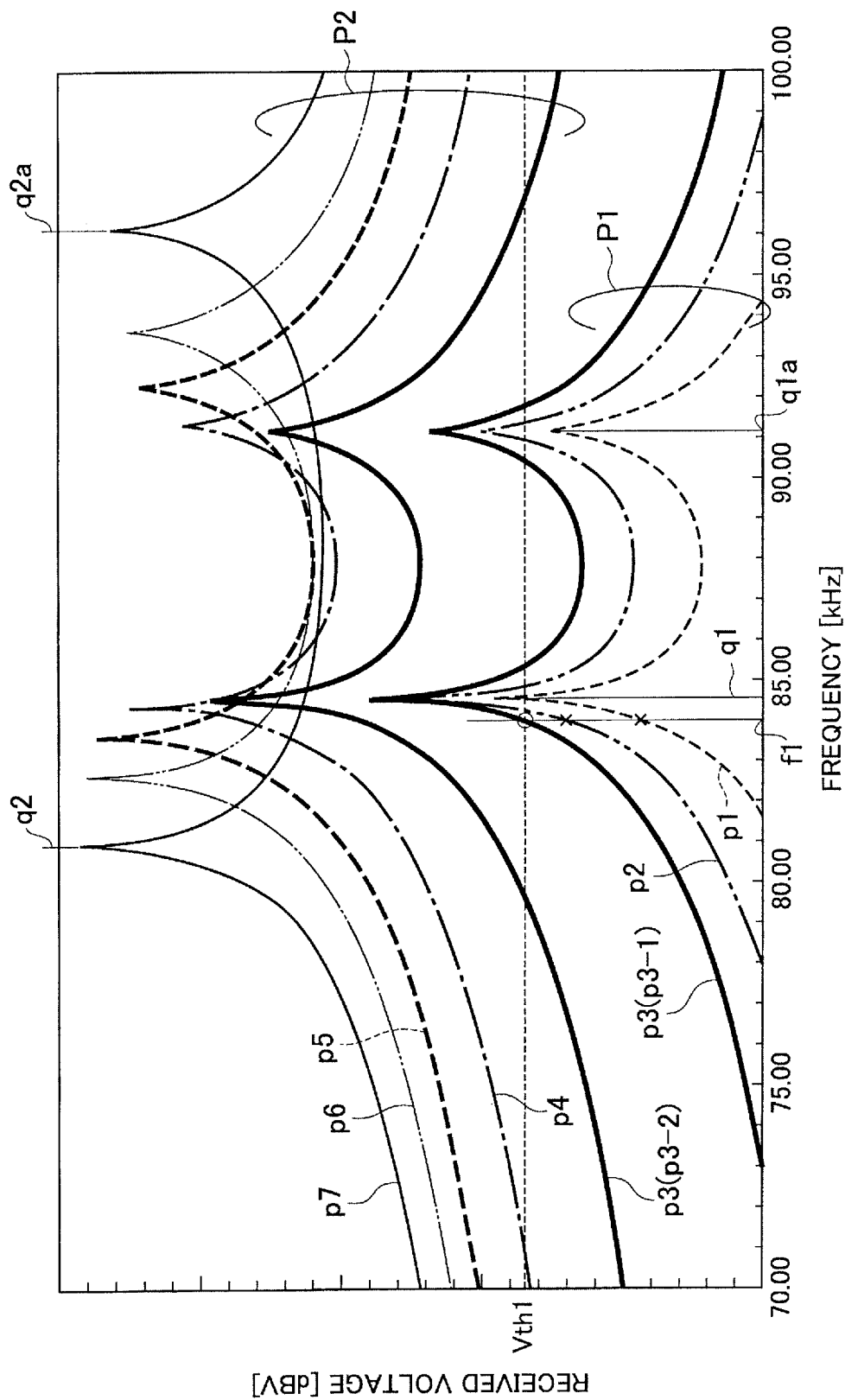
FIG. 2 is a characteristic diagram showing relations between a frequency and a received voltage at various coupling coefficients according to a first embodiment of the present invention, which illustrates a case of setting a frequency of very weak excitation to f1.

FIG. 2 is a characteristic diagram showing relations among the excitation frequency, the received voltage, and the coupling coefficient between the power feeding coil 12 and the power receiving coil 22. A group P1 of curves illustrated in FIG. 2 show relations between the frequency and the received voltage [dBV] at various coupling coefficients when the power feeding coil 12 is brought into the very weak excitation (excitation with a very weak voltage). Note that the received voltage [dBV] is plotted in logarithmic values. A group P2 of curves show relations between the frequency and the received voltage [dBV] at the various coupling coefficients when the power feeding coil 12 is brought into the weak excitation (excitation with a weak voltage larger than the very weak voltage).

In the group P of curves, the coupling coefficient grows larger in the order of curves p1, p2, and p3 (p3-1). Moreover, in each of the curves p1 to p3, the received voltage becomes high in the vicinity of each of frequencies q1 and q2 corresponding to two resonance points.

On the other hand, in the group P2 of curves, the coupling coefficient grows larger in the order of curves p3 (p3-2), p4, p5, p6, and p7. Here, the curve p3 (indicated as p3-1) included in the group P1 of curves and the curve p3 (indicated as p3-2) included in the group P2 of curves apply the same coupling coefficient. The resonance points therefore coincide with one another between these curves.

Meanwhile, the curve p7 included in the group P2 of curves shows characteristics when the coupling coefficient reaches the maximum, while the curve p5 therein shows characteristics when the coupling coefficient reaches the allowable coupling coefficient. As described previously, the allowable coupling coefficient represents the coupling coefficient in the state where the positional relation between the power feeding coil 12 and the power receiving coil 22 establishes a state capable of carrying out the non-contact power supply. Accordingly, the non-contact power supply becomes possible when the coupling coefficient between the power feeding coil 12 and the power receiving coil 22 exceeds the allowable coupling coefficient. In the following, the coupling coefficients of the curves p1 to p7 shown in FIG. 2 will be defined as K1 to K7, respectively.

As can be seen from the groups P1 and P2 of curves in FIG. 2, the circuit formed from the power feeding coil 12 and the power receiving coil 22 has the two resonance points (peak frequencies). Here, the lower resonance point (the peak frequency) represents an in-phase resonance point while the higher resonance point (the peak frequency) represents a reverse phase resonance point. Moreover, in the group P2 of curves, an interval between the two resonance points grows wider as the coupling coefficient grows larger. Since the in-phase resonance point and the reverse phase resonance point are of the publicly known technique, detailed description thereof will be omitted.

Meanwhile, when the power feeding coil 12 is brought into the very weak excitation in this embodiment, the frequency for exciting the power feeding coil 12 is set to a frequency near a resonance frequency of the circuit formed from the power feeding coil 12 and the power receiving coil 22. For example, as shown in FIG. 2, the frequency is set to a frequency f1 near the in-phase resonance point q1. In this way, the power receiving coil 22 can obtain the high received voltage even in the case of the very weak excitation. In other words, it is possible to detect the received voltage without using a high-accuracy detector.

The power feeding coil 12 is switched from the very weak excitation to the weak excitation when the vehicle 10 approaches the chargeable position in the parking space 2 in the state where the power feeding coil 12 is brought into the very weak excitation and the received voltage with the power receiving coil 22 reaches the first threshold voltage Vth1 shown in FIG. 2. For example, if the received voltage exceeds the first threshold voltage Vth1 when the coupling coefficient is K3 (the curve p3-1), the power feeding coil 12 is switched from the very weak excitation to the weak excitation at this point. Note that a symbol "x" on the frequency f1 in FIG. 2 indicates a state of not reaching the first threshold voltage Vth1 and a symbol "○" thereon indicates a state of reaching the first threshold voltage Vth1.

Figure 3:
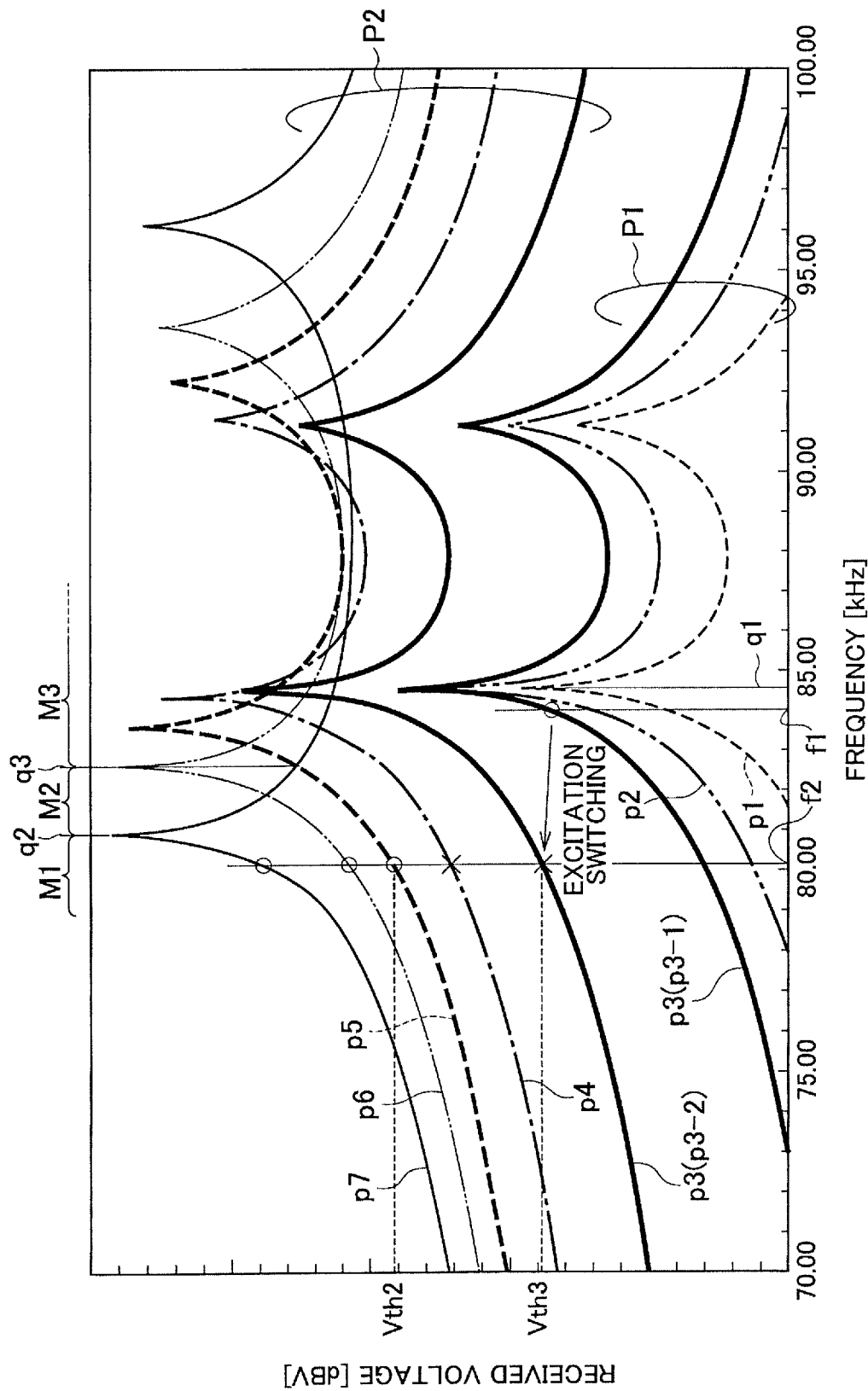
FIG. 3 is a characteristic diagram showing relations between the frequency and the received voltage at the various coupling coefficients according to the first embodiment of the present invention, which illustrates a case of setting a frequency of weak excitation in a range M1 (at a frequency f2).

Here, the frequency for exciting the power feeding coil 12 is changed simultaneously with the switching to the weak excitation. In this case, the frequency is set to a frequency in any one of frequency ranges shown in (A) and (B) below:

(A) a frequency in a certain range lower than the resonance point when the coupling coefficient is the maximum coupling coefficient K7, that is, lower than the peak (q2 in FIG. 2) of the curve p7 (indicated with M1 in FIG. 3); and (B) a frequency between the above-mentioned frequency q2 and a frequency q3 where the curve p5 at the allowable coupling coefficient K5 and the curve p7 at the maximum coupling coefficient K7 cross each other (indicated with M2 in FIG. 3).

[Case of Switching to Frequency in Range (A) Mentioned Above]

Figure 5:
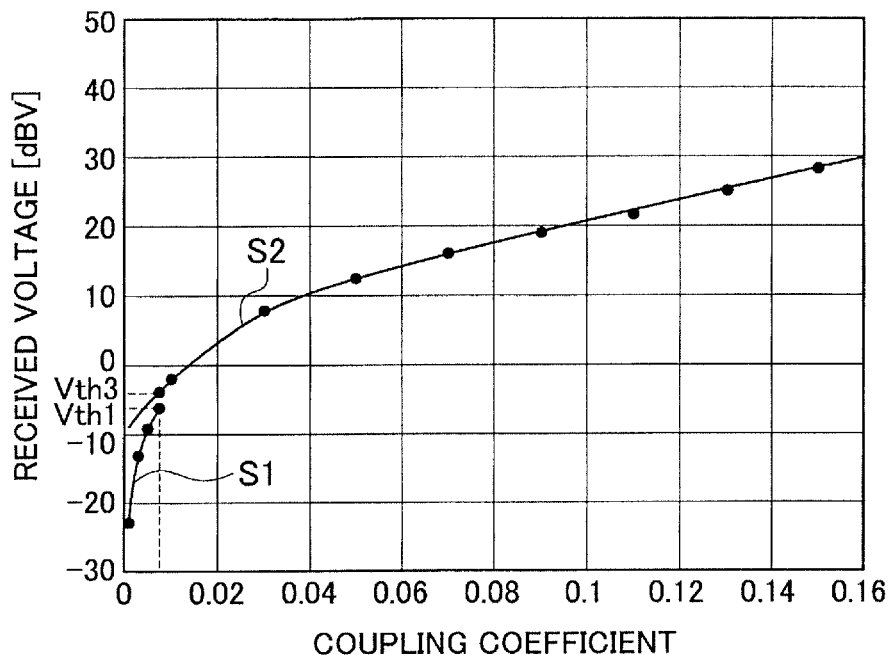
FIG. 5 is a characteristic diagram showing a relation between the coupling coefficient and the received voltage according to the first embodiment of the present invention.

The case of setting the frequency in the above-mentioned range (A) will be described below with reference to a characteristic diagram shown in FIG. 3. The excitation frequency is switched at the same time as switching the power feeding coil 12 from the very weak excitation to the weak excitation. In this instance, the excitation voltage of the power feeding coil 12 is changed, whereby the characteristic at the coupling coefficient K3 is switched from the curve p3-1 to the curve p3-2. Meanwhile, the received voltage in the case of the weak excitation (Vth3 shown in FIG. 3: a lower limit threshold voltage) is set larger than the received voltage in the case of the very weak excitation (Vth1 shown in FIG. 2). Specifically, as shown in FIG. 3, when the coupling coefficient is increased and the switching from the very weak excitation to the weak excitation takes place, the received voltage is switched from Vth1 to Vth3 (Vth3>Vth1). FIG. 5 is a characteristic diagram showing a relation between the coupling coefficient and the received voltage, in which a curve S1 is switched to a curve S2 as a consequence of the switching from the very weak excitation to the weak excitation.

Moreover, the excitation frequency after the switching to the weak excitation is set to a frequency in the range M1 shown in FIG. 3, such as the frequency f2. In this way, the received voltage with the power receiving coil 22 is monotonously increased along with the increase in coupling coefficient (in the order of the curves p3-2, p4, p5, p6, and p7) as shown in FIG. 3. Note that a symbol "x" on the frequency f2 in FIG. 3 indicates a state of not reaching the second threshold voltage Vth2 and a symbol "○" thereon indicates a state of reaching the second threshold voltage Vth2.

Accordingly, the received voltage exceeds the second threshold voltage Vth2 in the case of the received voltage at the allowable coupling coefficient K5 (the curve p5) when the vehicle 10 is made to gradually approach the chargeable position while setting the excitation frequency to the frequency f2. Moreover, if the vehicle 10 is stopped at the position where the coupling coefficient comes closest to the maximum value, it is possible to stop the vehicle 10 at the maximum coupling coefficient K7 or in the vicinity thereof.

In other words, if the notification unit 30 shown in FIG. 1 notifies that the received voltage has reached the second threshold voltage Vth2, for example, the vehicle 10 will be stopped at the chargeable position as a consequence of stopping the vehicle 10 at an appropriate position thereafter.

Figure 6:
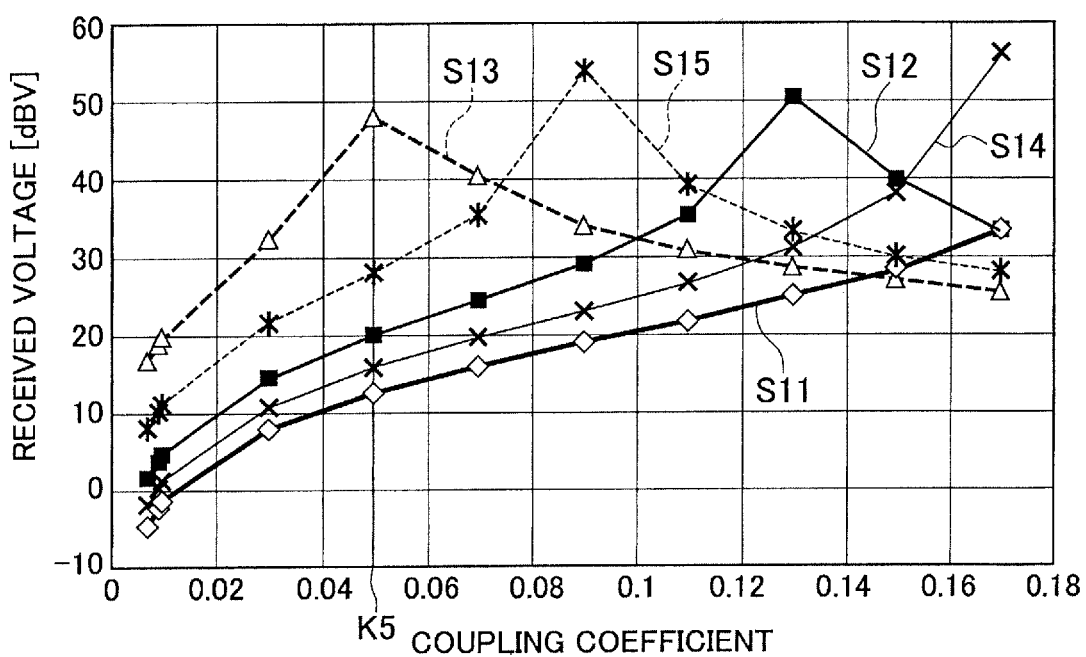
FIG. 6 is a characteristic diagram showing relations between the coupling coefficient and the received voltage in various frequency ranges according to the first embodiment of the present invention.

FIG. 6 is a characteristic, diagram showing relations between the coupling coefficient and the received voltage [dBV]. A curve S11 shows a relation between the coupling coefficient and the received voltage when setting the frequency to the condition of the range (A) mentioned above. Moreover, as can be seen from the curve S11, the received voltage is monotonously increased along with the increase in coupling coefficient. Thus, it is possible to locate the position where the coupling coefficient becomes the maximum or the position in the vicinity thereof with a simple operation as mentioned above.

Although the example of setting to the frequency lower than the frequency q2 of the in-phase resonance point of the curve p7 in the case of the maximum coupling coefficient K7 has been described above, it is also possible to set to a frequency higher than a frequency q2a of the reverse phase resonance point shown in FIG. 2. As can be seen in FIG. 2, the received voltage is monotonously increased along with the increase in coupling coefficient in the case of the reverse phase resonance point shown in FIG. 2 as well, and it is therefore possible to achieve the same effect as described above. In addition, a lower limit of the range M1 can be set to any desired frequency lower than the frequency q2.

[Case of Switching to Frequency in Range (B) Mentioned Above]

Next, the case of setting the frequency in the above-mentioned range (B) will be described with reference to a characteristic diagram shown in FIG. 4. In this example, when the power feeding coil 12 is switched from the very weak excitation to the weak excitation, the frequency is set in the range M2 shown in FIG. 4 at the same time. To be more precise, the frequency where the curve p5 at the allowable coupling coefficient K5 and the curve p7 at the maximum coupling coefficient K7 cross each other is defined as q3 and the frequency is set in the range M2 from this frequency q3 to the above-mentioned frequency q2.

Figure 4:
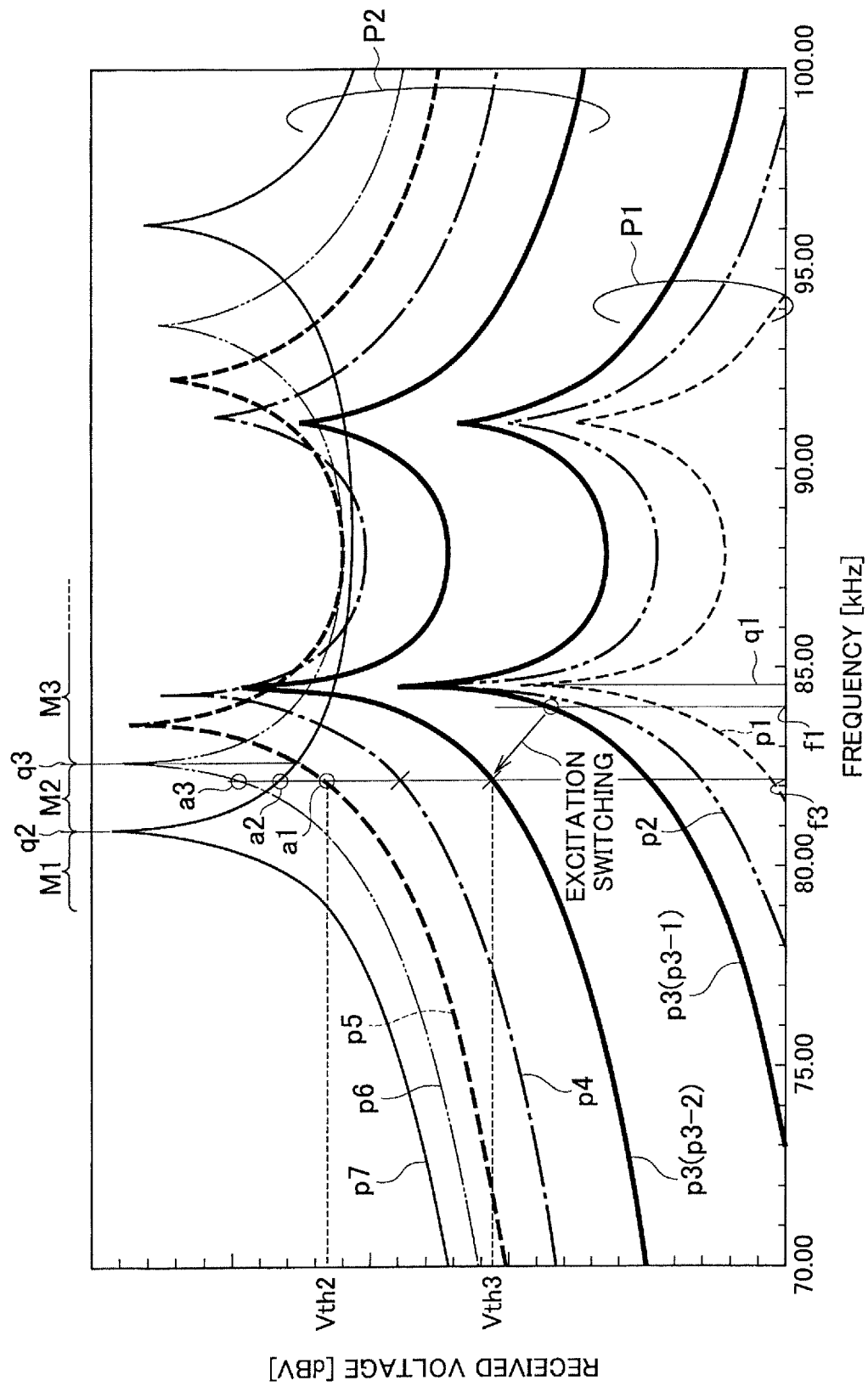
FIG. 4 is a characteristic diagram showing relations between the frequency and the received voltage at the various coupling coefficients according to the first embodiment of the present invention, which illustrates a case of setting the frequency of weak excitation in a range M2 (at a frequency f3).

In this case, when the coupling coefficient is increased as shown in FIG. 4, the received voltage rises along with this increase but the received voltage turns downward at a certain level. In other words, the received voltage is not monotonously increased but changed in the order of reference signs a1, a2, and a3 indicated in FIG. 4. Nonetheless, even when the received voltage turns downward, this voltage does not fall below the received voltage (the second threshold voltage Vth2) at the allowable coupling coefficient K5. Specifically, as shown in a curve S12 in FIG. 6, when the coupling coefficient is increased, the received voltage exceeds the second threshold voltage Vth2 (the received voltage at the coupling coefficient K5; a reference voltage) and reaches a maximum voltage. Thereafter, the received voltage turns downward but does not fall below the second threshold voltage Vth2.

Accordingly, as with the above-described case of the range M1, if the notification unit 30 shown in FIG. 1 notifies that the received voltage has reached the second threshold voltage Vth2, the vehicle 10 will be stopped at the chargeable position as a consequence of stopping the vehicle 10 at an appropriate position thereafter.

Although this description has been explained the case of involving the in-phase resonance point, the same effect can also be achieved in the case of involving the reverse phase resonance point.

[Case of Switching to Frequency Other than Ranges (A) and (B) Mentioned Above]

Next, a description will be given of a case of setting the frequency at the time of the switching to the weak excitation to a frequency out of the ranges (A) and (B) mentioned above. As shown in FIG. 4, when the frequency is set in a range M3 of a frequency higher than the frequency q3, the received voltage changes as shown in a curve S13 in FIG. 6 along with the increase in coupling coefficient. Specifically, the received voltage rises with the increase in coupling coefficient, and then the received voltage turns downward when the received voltage exceeds the allowable coupling coefficient K5 (when the received voltage exceeds the second threshold voltage Vth2). In the meantime, the received voltage falls below the second threshold voltage Vth2 representing the received voltage at the allowable coupling coefficient K5. In other words, the received voltage varies as shown in the curve S13 in FIG. 6 along with the change in coupling coefficient. Accordingly, if a certain received voltage is obtained, it is impossible to determine whether this received voltage is generated at the coupling coefficient larger than K5 or generated at the coupling coefficient smaller than K5. As a consequence, it may not be possible to determine whether or not the vehicle 10 is located at the chargeable position. In other words, when the power feeding coil 12 is brought into the weak excitation, it is possible to stop the vehicle 10 reliably at the chargeable position by setting the frequency either in the range M or in the range M2 as shown in (A) and (B) mentioned above. Note that a curve S14 shown in FIG. 6 depicts a case of the frequency q2 and a curve S15 therein depicts a case of the frequency q3.

As described above, in this embodiment, the very weak excitation is initially applied when the vehicle 10 is about to approach the chargeable position. In this instance, the excitation frequency for the power feeding coil 12 is set to the frequency near the resonance point so as to increase the received voltage with the power receiving coil 22. Thereafter, the very weak excitation is switched to the weak excitation when the vehicle 10 approaches the chargeable position, such as in the case where the power receiving coil 22 partially overlaps the power feeding coil 12. In this instance, the excitation frequency is set to the frequency in the range M1 or M2 as shown in (A) and (B) mentioned above. In this way, it is understood that the vehicle 10 can reliably be guided to the chargeable position without using the detection device having high detection accuracy.

[Description of Parking Position Determination Processing]

Figure 8:
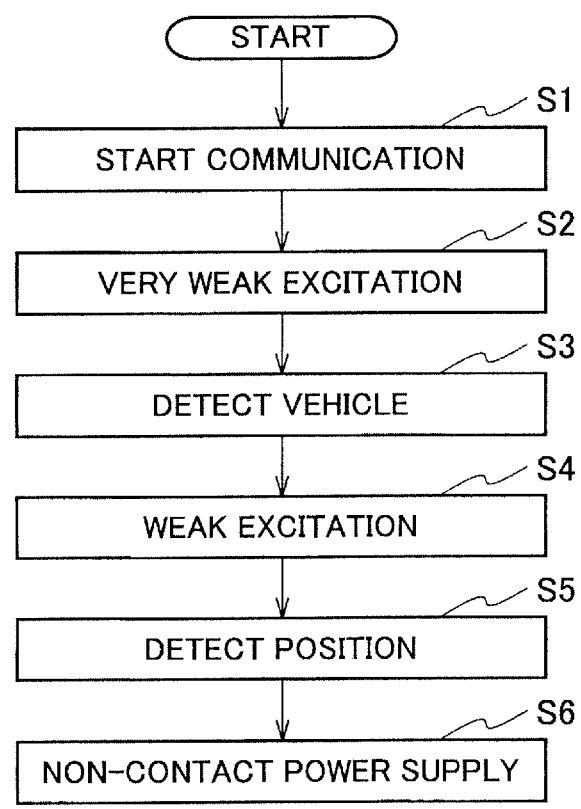
FIG. 8 is a flowchart showing outlined processing procedures with the non-contact power supply system according to the first embodiment of the present invention.
Figure 9:
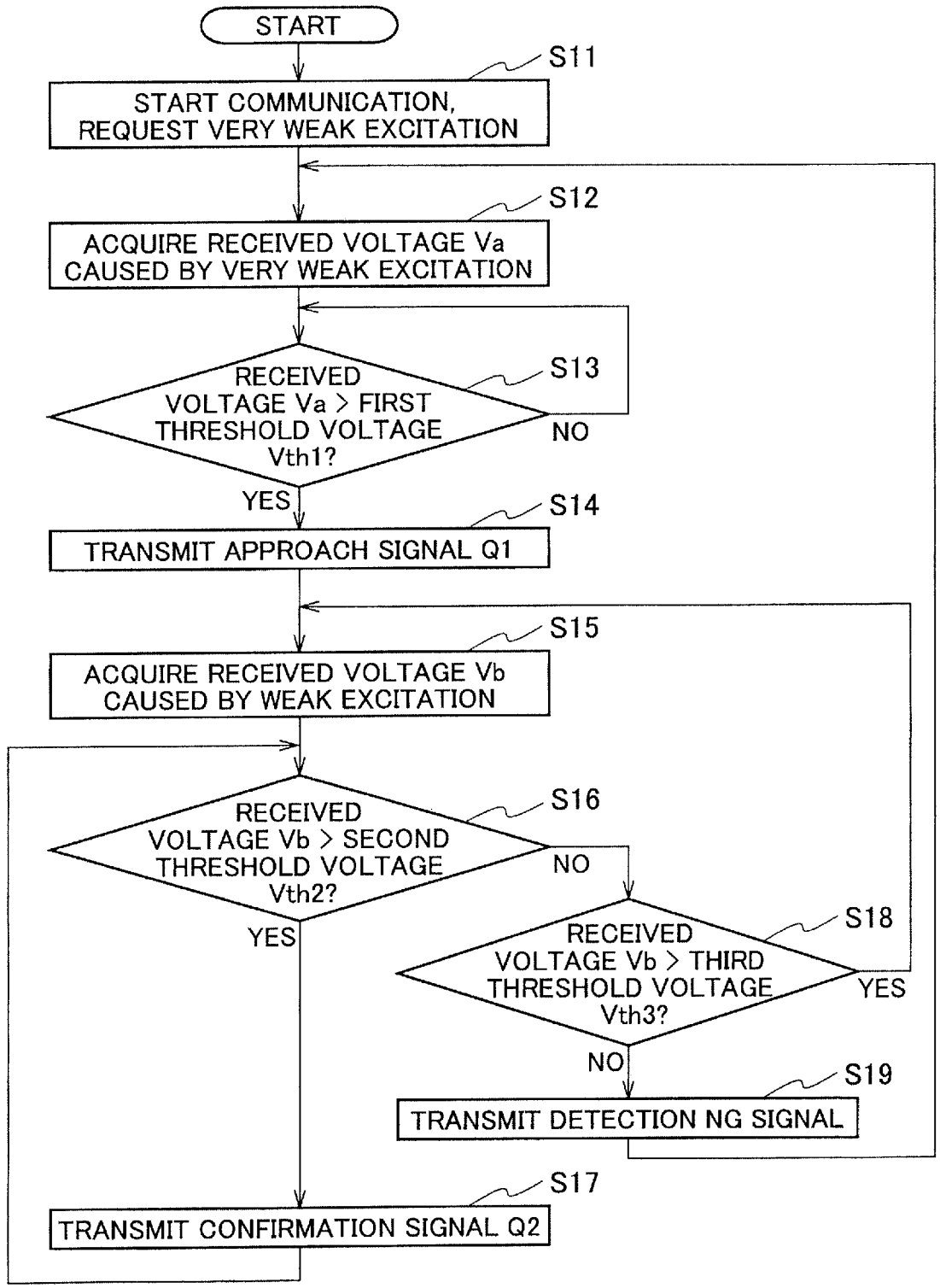
FIG. 9 is a flowchart showing processing procedures with a power receiving device in the non-contact power supply system according to the first embodiment of the present invention.
Figure 10:
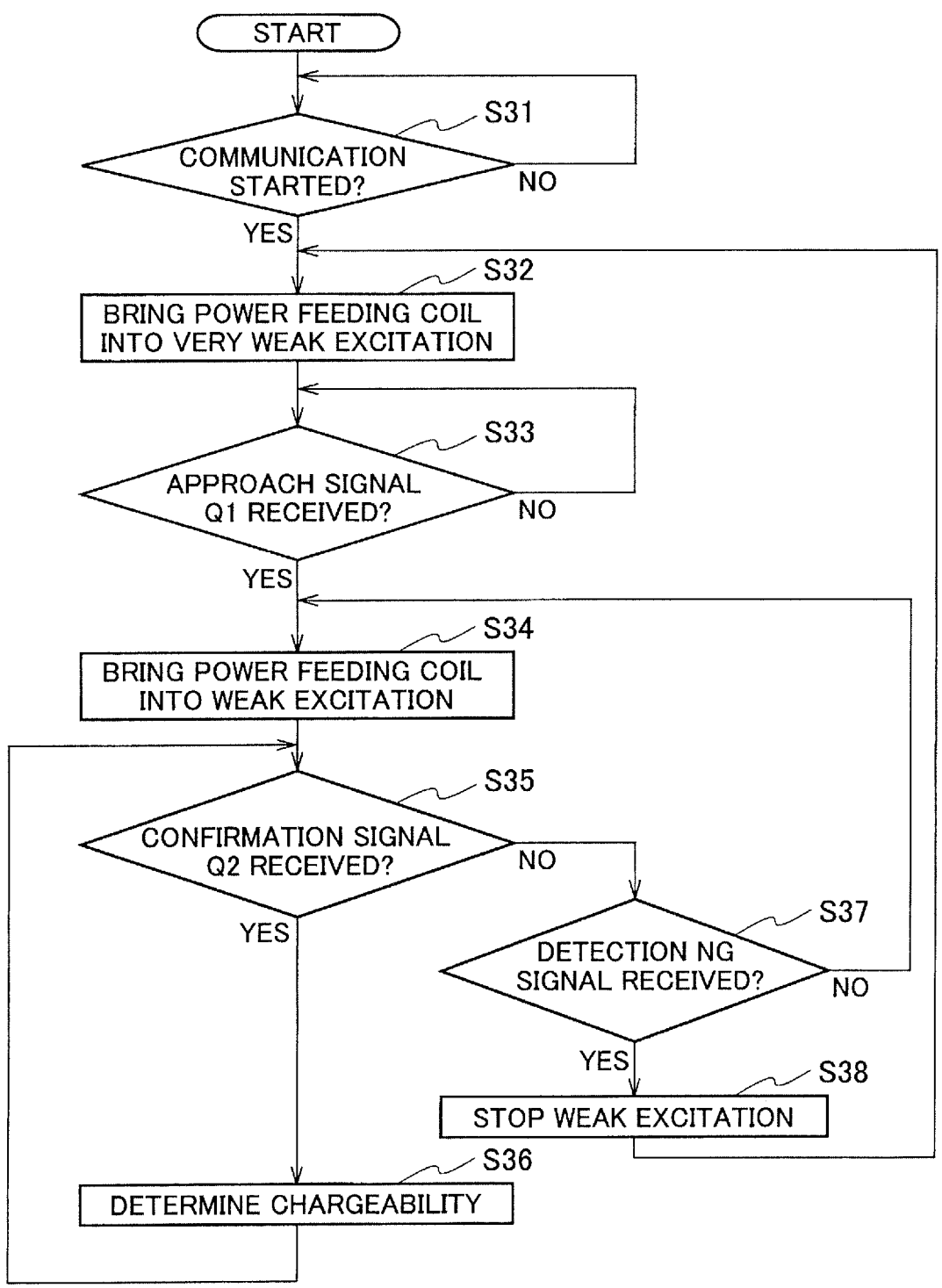
FIG. 10 is a flowchart showing processing procedures with a power supply device in the non-contact power supply system according to the first embodiment of the present invention.

Next, the processing to determine the parking position of the vehicle 10 by using the coil position detecting method of this embodiment will be described with reference to flowcharts shown in FIGS. 8 to 10. FIG. 8 is the flowchart schematically showing the entire flow. Meanwhile, FIG. 9 shows processing procedures with the power receiving device 200 loaded on the vehicle 10 and FIG. 10 shows processing procedures with the power supply device 100.

As shown in FIG. 8, in step S1, the non-contact power supply system 1 of this embodiment starts communication between the power receiving device 200 provided on the vehicle 10 side and the power supply device 100 provided on the ground side.

Subsequently, in step S2, the power feeding coil 12 is brought into the very weak excitation. In step S3, a determination is made as to whether or not the vehicle 10 approaches the chargeable position.

Thereafter, the power feeding coil 12 is switched to the weak excitation in step S4, and a determination is made in step S5 as to whether or not the vehicle 10 is parked at the chargeable position. Then, if the vehicle 10 is determined to be stopped at the chargeable position, the non-contact power supply is carried out in step S6.

Next, the processing procedures with the power receiving device 200 loaded on the vehicle 10 will be described with reference to the flowchart shown in FIG. 9. First, in step S11, the charging control unit 24 of the power receiving device 200 starts the communication with the power supply device 100 on the ground side and transmits a very weak excitation request signal to the power supply device 100. This communication is carried out between the wireless communication unit 23 and the wireless communication unit 13. In this instance, a trigger to start the communication can be done by means of a manual operation by a user, a start-up of an automated parking system, a search by the power receiving device 200, and so forth. As a consequence, the power feeding coil 12 is brought into the very weak excitation (see S32 in FIG. 10 to be described later).

In step S12, the charging control unit 24 acquires a received voltage Va with the power receiving coil 22. Moreover, a determination is made in step S13 as to whether or not the received voltage Va reaches the preset first threshold voltage Vth1.

Specifically, as shown in the group P1 of curves in FIG. 2 described above, as the vehicle 10 approaches the chargeable position and the coupling coefficient between the power feeding coil 12 and the power receiving coil 22 is increased while the power feeding coil 12 is brought into the very weak excitation at the frequency f1, the received voltage (which will be defined as Va) is increased in the order of the curves p1, p2, and p3-1, and reaches the first threshold voltage Vth1 when the coupling coefficient is K3 (the curve p3-1). For example, the received voltage Va is generated when the power receiving coil 22 partially overlaps the power feeding coil 12, whereby the received voltage Va reaches the first threshold voltage Vth1.

When the received voltage Va exceeds the first threshold voltage Vth1 (YES in step S13), the charging control unit 24 transmits an approach signal Q1, which indicates the approach of the vehicle 10 to the chargeable position, to the power supply device 100 by using the wireless communication unit 23 in step S14. As a consequence, the power feeding coil 12 is switched from the very weak excitation to the weak excitation (see S34 in FIG. 10 to be described later). In this instance, the excitation frequency is set to the frequency in the range M1 or M2 shown in FIG. 3.

In step S15, the charging control unit 24 acquires the received voltage (which will be defined as Vb) with the power receiving coil 22. Moreover, a determination is made in step S16 as to whether or not this received voltage Vb reaches the preset second threshold voltage Vth2. As mentioned above, the received voltage Vb when the coupling coefficient between the power feeding coil 12 and the power receiving coil 22 reaches the allowable coupling coefficient K5 is set to the second threshold voltage Vth2.

Accordingly, when the received voltage Vb exceeds the second threshold voltage Vth2 (YES in step S16), the charging control unit 24 transmits a confirmation signal Q2 in step S17, which is a signal indicating that the vehicle 10 has reached the chargeable position.

In this instance, when the weak excitation frequency is in the range indicated as M in FIG. 3 as mentioned above, the received voltage is monotonously increased along with the increase in coupling coefficient. Accordingly, it is possible to stop the vehicle 10 at the chargeable position easily and reliably by stopping the vehicle 10 at the position where the received voltage reaches the maximum value.

Meanwhile, when the weak excitation frequency is in the range indicated with M2 in FIG. 3, the vehicle 10 reaches the chargeable position and the received voltage is not monotonously increased. Nonetheless, the received voltage does not fall below that at the allowable coupling coefficient. Accordingly, it is possible to stop the vehicle 10 at the chargeable position easily and reliably by stopping the vehicle 10 after the received voltage Vb exceeds the second threshold voltage Vth2.

On the other hand, in step S16 of FIG. 9, when the received voltage Vb does not reach the second threshold voltage Vth2 (NO in step S16), the charging control unit 24 determines in step S18 whether or not the received voltage Vb exceeds a preset third threshold voltage Vth3. The third threshold voltage Vth3 is a voltage used for determining that the power feeding coil 12 is located away from the power receiving coil 22 while the power feeding coil 12 is brought into the weak excitation (see the curve S2 in FIG. 5).

Accordingly, when the received voltage Vb falls below the third threshold voltage Vth3 (NO in step S18), a detection NG signal is transmitted in step S19. This detection NG signal switches the power feeding coil 12 from the weak excitation to the very weak excitation again, and then the processing returns to step S12.

On the other hand, the processing returns to step S15 when the received voltage Vb does not fall below the third threshold voltage Vth3 (YES in step S18).

Next, the processing procedures with the power supply device 100 will be described with reference to the flowchart shown in FIG. 10. First, in step S31, the control unit 14 of the power supply device 100 determines whether or not the very weak excitation request signal is acquired. The very weak excitation request signal is the signal transmitted from the wireless communication unit 23 of the power receiving device 200 in the processing in step S11 of FIG. 9.

When the very weak excitation request signal is acquired (YES in step S31), the control unit 14 supplies the power for the very small excitation to the power feeding coil 12 to bring the power feeding coil 12 into the very weak excitation in step S32. In this instance, the excitation frequency is set to the frequency near the resonance point as mentioned previously. For example, the excitation frequency is set to the frequency f1 shown in FIG. 2.

In step S33, the control unit 14 determines whether or not the approach signal Q1 associated with the processing in step S14 in FIG. 9 is received. When the approach signal Q1 is received (YES in step S33), the control unit 14 increases the power to be supplied to the power feeding coil 12, thereby switching to the weak excitation in step S34. In this instance, as mentioned previously, the excitation frequency to bring the power feeding coil 12 into the weak excitation is set to the frequency either in the range M1 or in the range M2 shown in FIG. 3.

In step S35, the control unit 14 determines whether or not the confirmation signal Q2 associated with the processing in step S17 in FIG. 9 is received.

When the confirmation signal Q2 is not received, or in other words, when the vehicle 10 is yet to reach the chargeable position (NO in step S35), the control unit 14 determines in step S37 whether or not the detection NG signal associated with the processing in step S19 in FIG. 9 is received.

When the detection NG signal is not received (NO in step S37), the processing returns to step S34 to continue the weak excitation. On the other hand, when the detection NG signal is received (YES in step S37), the control unit 14 stops the weak excitation in step S38. Moreover, the processing returns to S32 to bring the power feeding coil 12 into the very weak excitation.

In the meantime, when the confirmation signal Q2 is received in the processing in step S35 (YES in step S35), the control unit 14 determines in step S36 that the vehicle 10 is stopped at the chargeable position in the parking space 2, and determines that the non-contact power supply is feasible.

In this way, when the vehicle 10 is parked in the parking space 2 for the non-contact power supply, the power feeding coil 12 is first brought into the very weak excitation, and the power feeding coil 12 is switched to the weak excitation when the vehicle 10 reaches the chargeable position. Then, the vehicle 10 is determined to be chargeable when the vehicle 10 reaches the chargeable position, and the non-contact charging takes place.

As described above, in the non-contact power supply system 1 adopting the coil position detecting method of this embodiment, the excitation voltage and the excitation frequency for the power feeding coil 12 are changed depending on the position of the power receiving coil 22 relative to the power feeding coil 12. Then, the position of the power receiving coil 22 is detected based on the received voltage detected with the power receiving coil 22. Accordingly, it is possible to reliably detect the position of the power receiving coil 22 relative to the power feeding coil 12 without using the high-accuracy detection device.

Meanwhile, the power feeding coil 12 is brought into the very weak excitation until the vehicle 10 reaches the chargeable position in the parking space 2 to undergo the non-contact power supply. In other words, the power feeding coil 12 is brought into first excitation (the very weak excitation) with a first excitation voltage and at a first frequency (f1). Thereafter, the power feeding coil 12 is switched to the weak excitation when the vehicle 10 approaches the parking space 2 and reaches the chargeable position, that is, when the received voltage reaches the first threshold voltage Vth1. In other words, the power feeding coil 12 is switched to second excitation (the weak excitation) with a second excitation voltage and at a second frequency (f2). Then, a determination as being chargeable is made if the coupling coefficient reaches the allowable coupling coefficient when the weak excitation is established.

Accordingly, when the vehicle 10 is approaching the parking space 2, the power feeding coil 12 is brought into the very weak excitation (the first excitation). Hence, even if a person is present or a metallic foreign object is placed near the power feeding coil 12, it is possible to avoid an adverse effect thereon. In addition, when the vehicle 10 reaches the chargeable position, the weak excitation (the second excitation having the relatively larger excitation voltage than that of the first excitation) is established at the excitation frequency in the range M1 or M2 shown in FIGS. 3 and 4. Thus, it is possible to guide the vehicle 10 reliably to the chargeable position.

In other words, the excitation frequency is set to the frequency either in the range M1 or in the range M2 shown in FIG. 3 at the time of switching to the weak excitation. Accordingly, the received voltage varies as shown in the curve S11 or S12 depicted in FIG. 6 along with the change in coupling coefficient. Thus, it is possible to reliably determine that the vehicle 10 reaches the chargeable position when the received voltage exceeds the second threshold voltage Vth2. It is therefore possible to stop the vehicle 10 reliably and easily at the chargeable position.

Meanwhile, the frequency (the first frequency) at the time of establishing the very weak excitation is set to the frequency near the resonance frequency (see f1 in FIG. 2). Hence, the value of the received voltage generated at the power receiving coil 22 is increased so that the received voltage can be detected with a relatively inexpensive general-purpose detection device.

Moreover, after having brought the power feeding coil 12 into the weak excitation (the second excitation), the power feeding coil 12 is brought back to the very weak excitation (the first excitation) if the received voltage falls below the lower limit threshold voltage Vth3. Accordingly, even when the vehicle 10 once approaches the parking space 2 and then moves away again as in the case where the vehicle 10 turns back near the parking space 2, for example, it is still possible to reliably switch between the weak excitation and the very weak excitation.

In the meantime, the frequency (the second frequency) at the time of establishing the weak excitation is set to the frequency in the range M1 or M2 shown in FIGS. 3 and 4. To be more precise, on the assumption that the received voltage when the coupling coefficient is increased to reach the allowable coupling coefficient is defined as the reference voltage (the second threshold voltage Vth2, for example), the second frequency is set to a frequency having such a characteristic that keeps the received voltage from falling below the reference voltage in the case of the increase in coupling coefficient later. Accordingly, when the received voltage reaches the reference voltage, the vehicle is surely stopped at the chargeable position. Thus, it is possible to carry out the non-contact power supply reliably.

Furthermore, the frequency (the second frequency) at the time of establishing the weak excitation is set either to the frequency (in the range M1) lower than the frequency f2 at the in-phase resonance point shown in FIG. 3, or to the frequency higher than the frequency at the reverse phase resonance point shown in FIG. 3. In this way, the received voltage is monotonously increased along with the increase in coupling coefficient. Thus, it is possible to surely stop the vehicle at the chargeable position.

Meanwhile, a minimum received voltage when establishing the weak excitation (the second excitation) is set higher than a maximum received voltage when establishing the very weak excitation (the first excitation). Specifically, the lower limit threshold voltage Vth3 shown in FIG. 5 is set larger than the first threshold voltage Vth1. Due to this setting, the received voltage rises when the very weak excitation is switched to the weak excitation. Accordingly, the received voltage can be smoothly detected.

Description of Modified Example of First Embodiment

Next, a description will be given of a modified example of the above-mentioned first embodiment. The first embodiment has described the example of bringing the power feeding coil 12 into the very weak excitation, in which the power feeding coil 12 is switched to the weak excitation when the received voltage Va with the power receiving coil 22 reaches the first threshold voltage Vth1.

On the other hand, according to the coil position detecting method of the modified example, when the power feeding coil 12 is brought into the very weak excitation, the power feeding coil 12 is switched to the weak excitation on the condition that the received voltage is detected with the power receiving coil 22. In other words, when the very weak excitation is established, the received voltage to be detected is extremely small. This received voltage will be detected when the power receiving coil 22 partially overlaps the power feeding coil 12.

Figure 7:
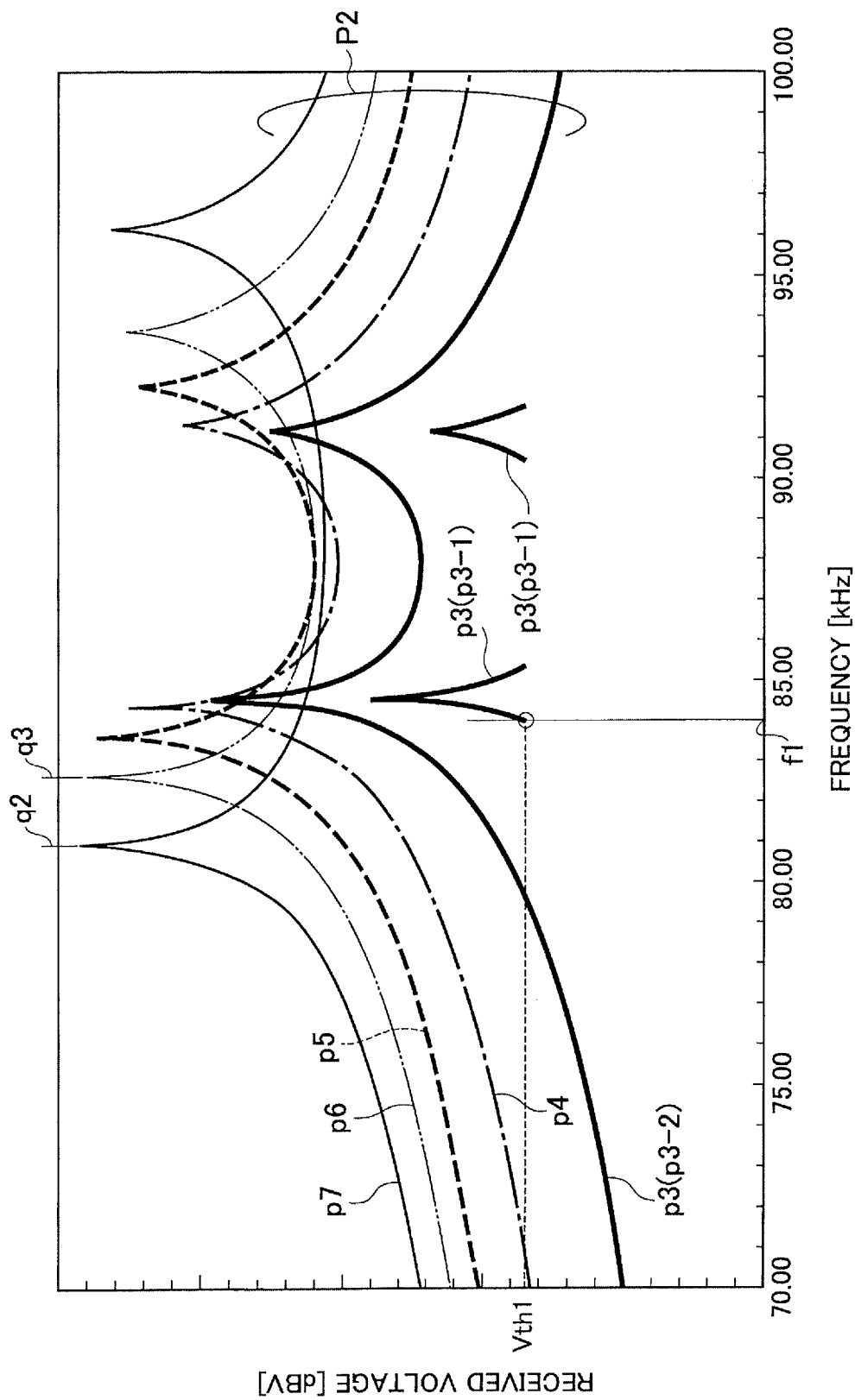
FIG. 7 is a characteristic diagram showing relations between the frequency and the received voltage at the various coupling coefficients according to a modified example of the first embodiment.

Specifically, when the very weak excitation is established by setting the excitation frequency to f1 as shown in FIG. 7, the received voltage is detected when the coupling coefficient reaches a predetermined level (in the case of the curve p3 in FIG. 7). In FIG. 7, no received voltage is generated when the coupling coefficient does not reach K3 (a curve p3-1) (when the received voltage falls below Vth1). Accordingly, the characteristic curve remains blank. Then, the very weak excitation is switched to the weak excitation when the received voltage is detected. In other words, the power feeding coil 12 is brought into the first excitation (the very weak excitation) and is switched to the second excitation (the weak excitation) when the received voltage is detected with the power receiving coil 22. It is possible to achieve the same effect as that of the first embodiment described above in the case of adopting the aforementioned procedures as well.

Description of Second Embodiment

Next, a second embodiment of the present invention will be described. The aforementioned first embodiment has described the example configured such that, when the power feeding coil 12 is brought into the very weak excitation, the power feeding coil 12 is switched to the weak excitation as the vehicle 10 approaches the chargeable position in the parking space 2 and the received voltage Va detected with the power receiving coil 22 exceeds the first threshold voltage Vth1.

On the other hand, in the second embodiment, the power feeding coil 12 is switched to the weak excitation when the vehicle 10 is stopped after the received voltage Va exceeds the first threshold voltage Vth1. Here, the system configuration is the same as that shown in FIG. 1. Accordingly, the description of the configuration will be omitted.

Figure 11:
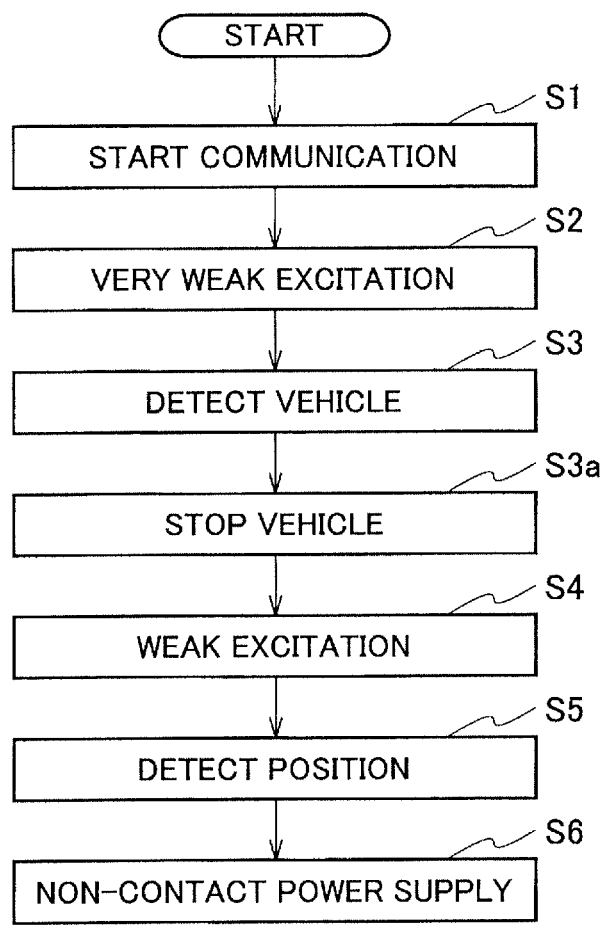
FIG. 11 is a flowchart showing outlined processing procedures with the non-contact power supply system according to a second embodiment of the present invention.
Figure 12:
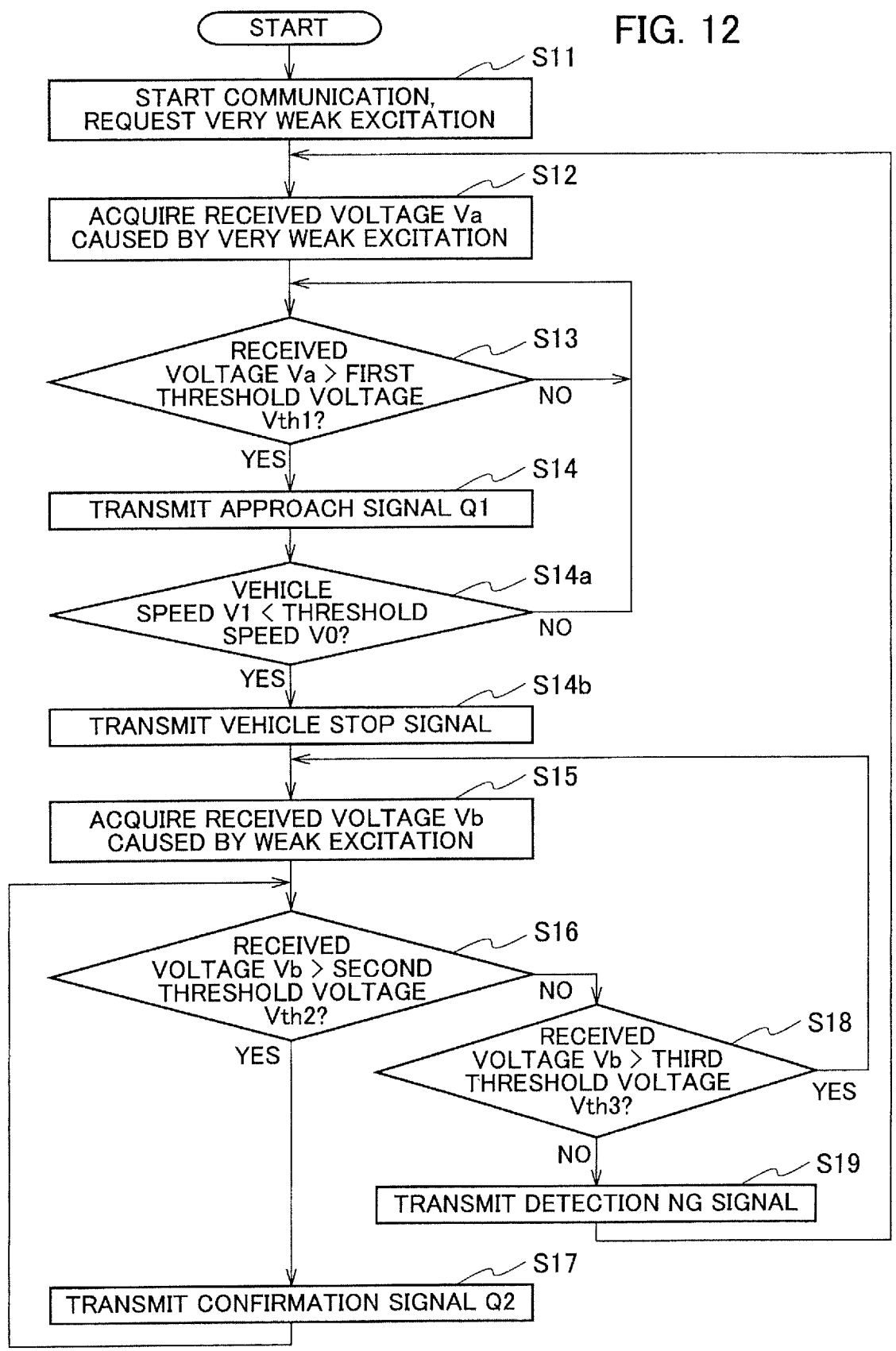
FIG. 12 is a flowchart showing processing procedures with the power receiving device in the non-contact power supply system according to the second embodiment of the present invention.
Figure 13:
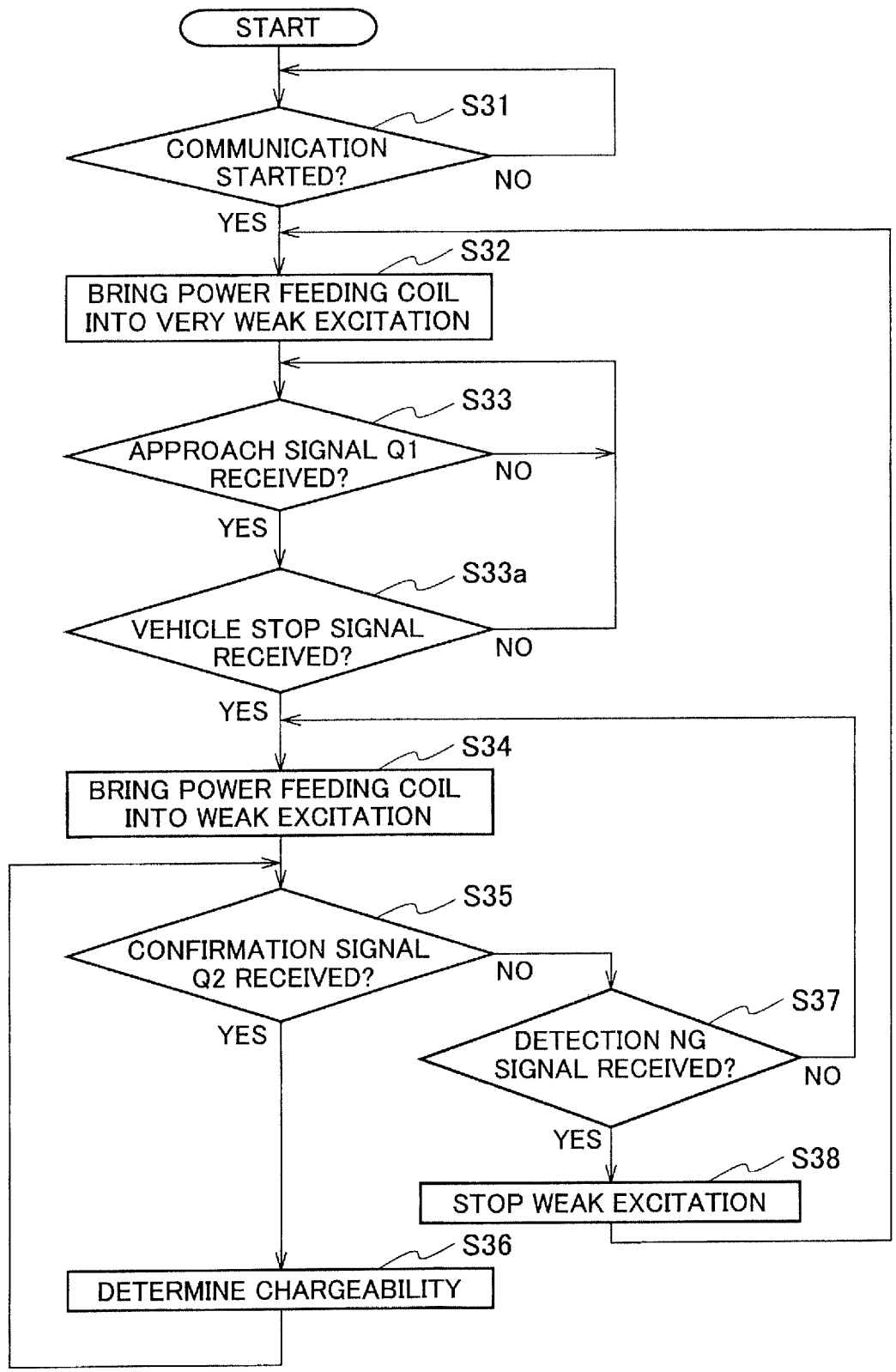
FIG. 13 is a flowchart showing processing procedures with the power supply device in the non-contact power supply system according to the second embodiment of the present invention.

Processing procedures with the non-contact power supply system adopting a coil position detecting method according to the second embodiment will be described below with reference to FIGS. 11 to 13. FIG. 11 is a flowchart schematically showing the entire flow. Meanwhile, FIG. 12 shows processing procedures with the power receiving device 200 loaded on the vehicle 10 while FIG. 13 shows processing procedures with the power supply device 100.

As shown in FIG. 11, in step S1, the non-contact power supply system 1 according to the second embodiment starts communication between the power receiving device 200 provided on the vehicle 10 side and the power supply device 100 provided on the ground side, Subsequently, in step S2, the power feeding coil 12 is brought into the very weak excitation. In step S3, a determination is made as to whether or not the vehicle 10 approaches the chargeable position. In step S3a, a determination is made as to whether or not the vehicle 10 is stopped. Thereafter, in step S4, the power feeding coil 12 is switched to the weak excitation, and a determination is made in step S5 as to whether or not the vehicle 10 is stopped at the chargeable position. Then, if the vehicle 10 is determined to be stopped at the chargeable position, the non-contact power supply is carried out.

Next, the processing procedures with the power receiving device 200 will be described with reference to a flowchart shown in FIG. 12. The processing shown in FIG. 12 is different from the above-described processing shown in FIG. 9 in that processing in step S14a and S14b is additionally provided. The rest of the processing, namely, the processing in steps S11 to S14 and S15 to S19 is the same as the processing shown in FIG. 9. Accordingly, the same step numbers will be attached and the description thereof will be omitted.

When the approach signal Q1 is transmitted in step S14 of FIG. 12, the charging control unit 24 determines whether or not a vehicle speed V1 is below a preset threshold speed V0. The threshold speed V0 is a numerical value used for determining the stop of the vehicle 10. When the vehicle 10 is stopped, V1<V0 holds true.

Then, when the vehicle 10 is stopped (YES in step S14a), the charging control unit 24 transmits a vehicle stop signal in step S14b. Thereafter, the processing proceeds to step S15.

Next, the processing procedures with the power supply device 100 will be described with reference to a flowchart shown in FIG. 13. The processing shown in FIG. 13 is different from the above-described processing shown in FIG. 10 in that processing in step S33a is additionally provided. The rest of the processing, namely, the processing in steps S31 to S33 and S34 to S38 is the same as the processing shown in FIG. 10. Accordingly, the same step numbers will be attached and the description thereof will be omitted.

When the approach signal Q1 is received in step S33 of FIG. 13, the control unit 14 subsequently determines in step S33a whether or not the vehicle stop signal is received. Then, when the vehicle stop signal is received (YES in step S33a), the processing proceeds to step S34 and the power feeding coil is brought into the weak excitation.

As described above, in the non-contact power supply system 1 adopting the coil position detecting method according to the second embodiment, in the case where the power feeding coil 12 is brought into the very weak excitation and the vehicle 10 approaches the chargeable position, the excitation of the power feeding coil is switched from the very weak excitation to the weak excitation when the vehicle 10 is stopped thereafter. By setting the stop of the vehicle 10 as the condition, it is possible to switch from the very weak excitation to the weak excitation safely. Moreover, it is also possible to set a certain switching condition when the vehicle is stopped.

Description of Third Embodiment

Next, a third embodiment of the present invention will be described. The aforementioned first embodiment has described the example in which the power receiving device 200 loaded on the vehicle 10 corresponds to the power supply device 100 that carries out the non-contact power supply on a one-to-one basis. On the other hand, the third embodiment will describe a case where there are multiple parking spaces. In this case, it is necessary to provide pairing processing between the vehicle 10 and any of the parking spaces 2 for the non-contact power supply.

Figure 14:
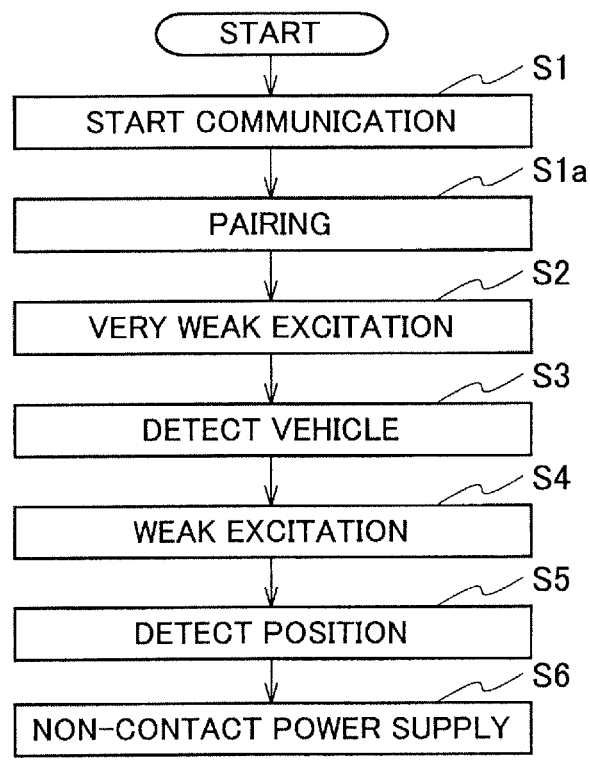
FIG. 14 is a flowchart showing outlined processing procedures with the non-contact power supply system according to a third embodiment of the present invention.

Now, operations of the non-contact power supply system 1 according to the third embodiment will be described below with reference to a flowchart shown in FIG. 14. As compared to FIG. 8 described above, this embodiment is different therefrom in that processing in step S1a is additionally provided after step S1. Moreover, the pairing processing is executed in the processing in step S1a. In this processing, the vehicle 10 communicates with multiple power supply devices provided in the respective parking spaces by use of a wireless LAN. Then, in the case where the power supply device 100 to perform the power supply is determined as a result of the communication, the power feeding coil 12 provided in this power supply device 100 starts the weak excitation. The processing thereafter is the same as that in FIG. 8 explained above and the description thereof will be omitted.

Accordingly, since the third embodiment executes the pairing between the vehicle 10 and the parking space, the switching between the very weak excitation and the weak excitation by way of the communication between the vehicle 10 and the power supply device 100 in the parking space paired with the vehicle 10. Therefore, even when there are two or more parking spaces, it is possible to reliably stop the vehicle at the chargeable position in the desired parking space.

Description of Modified Example of Third Embodiment

Figure 15:
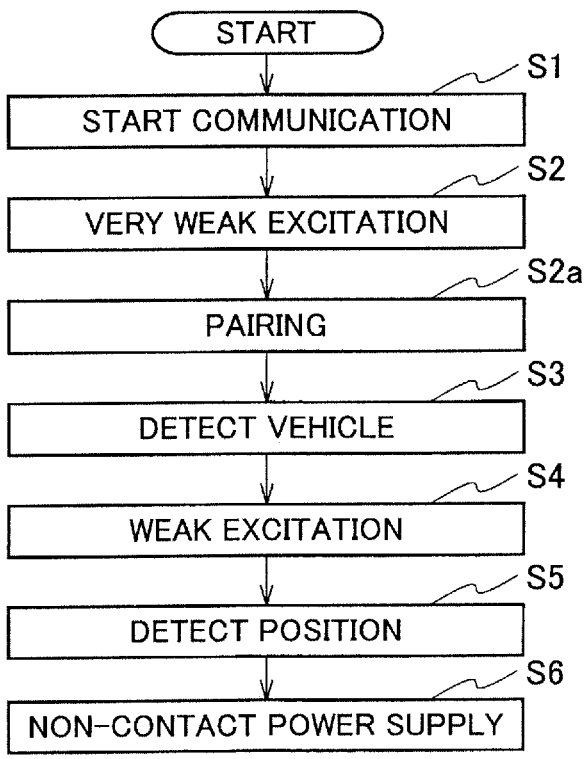
FIG. 15 is a flowchart showing outlined processing procedures with the non-contact power supply system according to a modified example of the third embodiment.

Next, a description will be given of a modified example of the third embodiment. In the modified example, the pairing is executed by using the very weak excitation. Specifically, as shown in a flowchart of FIG. 15, the power feeding coil 12 of the power supply device 100 provided in each parking space is brought into the very weak excitation in the processing in step S2. Moreover, in step S2a, communication data are superposed on the power used for the very weak excitation, and the pairing is conducted by detecting the very weak excitation power. Thereafter, the processing in step S3 and thereafter is executed.

The above-described configuration can also achieve the pairing of the vehicle 10 with one of the multiple power supply devices 100, so that the non-contact power supply can be carried out by stopping the vehicle 10 in the parking space of the power supply device 100 determined by the pairing.

Meanwhile, since the pairing is conducted by using the very weak excitation, it is possible to simplify the configuration without having to perform extra communication. Moreover, in this modified example, all of the power feeding coils 12 provided to the respective power supply devices 100 are brought into the very weak excitation. However, this configuration is extremely unlikely to affect a person or a metallic foreign object in the surroundings due to the small excitation power.

The coil position detecting method for a non-contact power supply system and the non-contact power supply system of the present invention have been described above based on the illustrated embodiments. It is to be noted, however, that the present invention is not limited only to these embodiments, and the configurations of the respective constituents may be replaced with any other configurations having similar functions.

REFERENCE SIGNS LIST 1 non-contact power supply system
2 parking space
10 vehicle
11 power control unit
12 power feeding coil
13 wireless communication unit
14 control unit
22 power receiving coil
23 wireless communication unit
24 charging control unit
25 rectification unit
26 relay unit
27 battery
28 inverter
29 motor
30 notification unit
100 power supply device
110 alternating-current power supply
111 rectification unit
112 PFC circuit
113 inverter
114 DC power supply
141 inverter control unit
142 PFC control unit
143 sequence control unit
200 power receiving device
241 voltage determination unit

The invention claimed is:

1. A coil position detecting method for a non-contact power supply system applicable to a non-contact power supply system to supply power from a power feeding coil on a ground side to a power receiving coil on a vehicle side, the coil position detecting method detecting a chargeable position of the power receiving coil, the chargeable position is defined as the power feeding coil and the power receiving coil are located opposite to each other, comprising:
bringing the power feeding coil into first excitation at a first frequency and with a first excitation voltage that avoids an adverse effect on a person present or a metallic foreign object placed near the power feeding coil;
bringing the power feeding coil into second excitation at a second frequency which is further from a resonance point than the first frequency and with a second excitation voltage larger than the first excitation voltage in response to determining that a received voltage received with the power receiving coil when the power feeding coil is brought into the first excitation reaches a first threshold voltage, the resonance point being defined as a resonance frequency created by a circuit formed by the power feeding coil, the power receiving coil and a capacitance, at which the received voltage with the power receiving coil is a maximum when the power feeding coil is brought into the first excitation; and
detecting the chargeable position of the power receiving coil based on a received voltage received with the power receiving coil when the power feeding coil is brought into the second excitation, wherein
the first excitation voltage is larger than zero, and
the received voltage is detected by a detector.

2. The coil position detecting method for a non-contact power supply system according to claim 1, further comprising:
detecting, by the detector, a received voltage received with the power receiving coil while the power feeding coil is brought into the second excitation, and
bringing the power feeding coil into the first excitation if the detected received voltage falls below a lower limit threshold voltage.

3. The coil position detecting method for a non-contact power supply system according to claim 1, further comprising:
setting the first frequency to a frequency near a resonance frequency of the circuit formed by the power receiving coil, the power feeding coil and the capacitance.

4. The coil position detecting method for a non-contact power supply system according to claim 1, further comprising:

setting, by a controller on the ground side, the second frequency to a frequency having such a characteristic that keeps a received voltage from falling below a reference voltage on a characteristic curve showing a relationship between the frequency and the received voltage in a case of a vehicle approaching the chargeable position, wherein the reference voltage is a voltage received when the power feeding coil and the power receiving coil are in the chargeable position.

5. The coil position detecting method for a non-contact power supply system according to claim 1, further comprising:

setting, by a controller on the ground side, the second frequency to any of a frequency below a lower peak frequency or a frequency above a higher peak frequency out of two peak frequencies on a characteristic curve showing a relationship between the frequency and a received voltage when the power feeding coil and the power receiving coil are opposed face-to-face.

6. The coil position detecting method for a non-contact power supply system according to claim 1, further comprising:

causing, by a controller on the ground side, a minimum received voltage received with the power receiving coil when the power feeding coil is brought into the second excitation to be higher than a maximum received voltage received with the power receiving coil when the power feeding coil is brought into the first excitation.

7. A non-contact power supply system configured to detect a chargeable position of a power receiving coil when supplying power from a power feeding coil on a ground side to the power receiving coil on a vehicle side, the chargeable position is defined as the power feeding coil and the power receiving coil are located opposite to each other, comprising:

an excitation voltage-frequency change circuit configured to change an excitation voltage and an excitation frequency for the power feeding coil depending on a position of the power receiving coil relative to the power feeding coil; and a position detection circuit configured to detect the chargeable position of the power receiving coil based on a received voltage received with the power receiving coil when the power feeding coil is excited by the excitation voltage-frequency change circuit, wherein the excitation voltage-frequency change circuit is configured to:

bring the power feeding coil into first excitation at a first frequency and with a first excitation voltage that avoids an adverse effect on a person present or a metallic foreign object placed near the power feeding coil, and bring the power feeding coil into second excitation at a second frequency which is further from a resonance point than the first frequency and with a second excitation voltage larger than the first excitation voltage in response to determining that a received voltage received with the power receiving coil when the power feeding coil is brought into the first excitation reaches a first threshold voltage, the resonance point being defined as a resonance frequency created by a circuit formed by the power feeding coil, the power receiving coil and a capacitance, at which the received voltage with the power receiving coil is a maximum when the power feeding coil is brought into the first excitation, the position detection circuit is configured to detect the chargeable position of the power receiving coil based on a received voltage received with the power receiving coil when the power feeding coil is brought into the second excitation, the first excitation voltage is larger than zero, and the received voltage is detected by a detector.

* * * * *